United States Patent [19]

Norman

[11] Patent Number: 4,622,990

[45] Date of Patent: Nov. 18, 1986

[54] VALVE AND COUPLING ASSEMBLIES

[75] Inventor: Geoffrey B. Norman, Gwynedd, England

[73] Assignee: Denis Ferranti Meters, Ltd., Gwynedd, England

[21] Appl. No.: 728,253

[22] Filed: Apr. 29, 1985

[30] Foreign Application Priority Data

May 2, 1984 [GB] United Kingdom ............... 8411300

[51] Int. Cl.⁴ .................. F16K 43/00; F04B 7/00; B65B 3/32
[52] U.S. Cl. ................. 137/315; 137/454.6; 137/512; 417/567
[58] Field of Search ............. 137/512, 315, 454.2, 137/454.6; 417/460, 567, 568

[56] References Cited

U.S. PATENT DOCUMENTS

| | | | |
|---|---|---|---|
| 180,375 | 7/1876 | Robinson | 417/460 |
| 492,699 | 2/1893 | Vaughn | 417/460 |
| 2,862,478 | 12/1958 | Staats | 417/568 |
| 3,187,680 | 6/1965 | Sutliff | 417/567 |
| 3,495,544 | 2/1970 | Enssle | 417/568 |
| 3,661,167 | 5/1972 | Hussey | 137/512 |
| 4,139,469 | 2/1979 | Ralnin et al. | 137/512 |
| 4,230,160 | 10/1980 | Buckley | 417/567 |

Primary Examiner—George L. Walton
Attorney, Agent, or Firm—Woodard, Weikart, Emhardt & Naughton

[57] ABSTRACT

A valve assembly for use in for example a stirrup pump. The valve assembly has a body defining a bore into which a carrier is inserted. The carrier defines a tubular passageway with a pair of O-rings spaced apart along the length of that passageway. The passageway is of substantially uniform internal diameter and the O-rings are received in annular grooves formed in the inside surface of the passageway. Two balls are provided each associated with one of the O-rings and an inlet port is provided which communicates with the space in the passageway between the O-rings. The application of an excess pressure to the port drives fluid from the port through one of the O-rings whereas the application of a reduced pressure to the port draws fluid through the other O-ring to the port.

5 Claims, 4 Drawing Figures

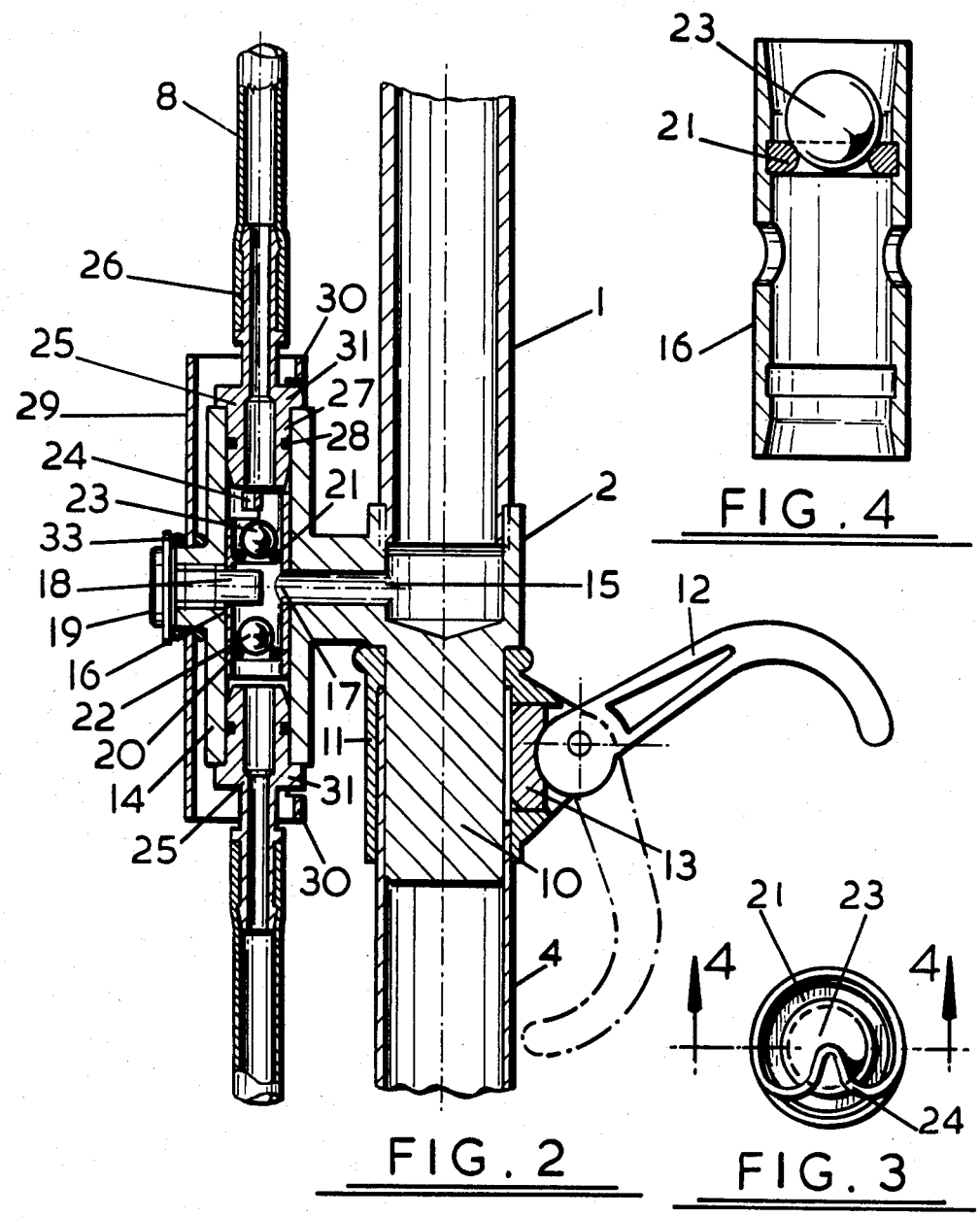

VALVE AND COUPLING ASSEMBLIES

The present invention relates to a valve assembly.

Simple hand operated pumps are required for a variety of purposes. One common use of such pumps is to pump fluid out of a container, e.g. to pump liquid fuel from a storage tank into a vehicle fuel tank. The most common hand operated pump used for such purposes is the so called "stirrup" pump which comprises a pump body, a hand operated pump handle which is reciprocated up and down, a flexible inlet hose which is dropped into the liquid to be pumped, and a flexible outlet hose which is directed to the point to which liquid is to be pumped. The pump body has a plate-like base which rests on the ground and is held down by the user's foot. The pump includes a double valve arrangement comprising two one-way valves arranged so that, as the pump handle is pulled up, liquid is drawn from the inlet into the pump body, and as the pump handle is pushed down, the liquid in the pump body is forced out into the outlet.

Known stirrup pumps are generally assembled from a number of parts secured together by screw interconnections. This makes it possible to dis-assemble the pumps for storage or cleaning purposes. Such arrangements are satisfactory where the user has plenty of time to carefully assemble the parts together and is not encumbered by protective clothing, and are not unduly expensive providing cheap materials such as plastics can be used to form the screw interconnections. In difficult applications where chemically aggressive liquids are to be pumped however not only is it necessary to use expensive materials such as stainless steel which are difficult to work but also users wear protective clothing which makes it very difficult for them to manipulate screw connections correctly. One extreme example of such a difficult application is encountered when considering how to enable military personnel to spray decontaminents onto for example vehicles after a chemical weapon attack. The personnel wear protective clothing of a sort which makes it particularly difficult for them to manipulate small pump components and which cannot be worn for prolonged periods of exertion. Furthermore the decontaminents are themselves chemically aggressive. Finally, the pumps will generally be stored loose in a bag exposed to the shocks that can be expected in a military vehicle but must be reliable even with hurried assembly after possibly years of rough treatment in storage.

It is an object of the present invention to provide a valve assembly which is easy to manufacture in a variety of materials and can be easily assembled into a hand operated pump.

According to the present invention, there is provided a valve assembly comprising a tubular passageway, a valve seat located within the passageway, and a valve member located within the passageway on one side of the valve seat such that movement of fluid along the passageway from the said one side of the valve seat to the other is prevented as a result of the valve member engaging the valve seat, wherein the passageway has a substantially uniform internal diameter, the valve seat is in the form of an O-ring the outside diameter of which when unrestrained is larger than the internal diameter of the passageway, the O-ring is retained in an annular groove formed in the inside surface of the passageway, and the valve member is a ball the outside diameter of which is less than the internal diameter of the passageway but greater than the internal diameter of the O-ring.

Surprisingly the O-ring is not pushed out of the passageway when the ball is pressed against it by pressures of the magnitude normally exerted in hand operated pumps. Thus an effective one-way valve can be assembled by cutting a simple groove inside a tube of for example stainless steel and then simply pushing in the O-ring and correctly positioning the ball. A high reliability chemical resistant valve can thus be obtained at low cost.

Preferably, two spaced apart O-rings and two balls are provided, one ball being located between the O-rings and the other being retained adjacent one of the O-rings at one end of the passageway.

Preferably, the passageway is defined by a carrier within which the balls and O-rings are retained, the carrier is received within a bore defined by a body, the bore having an inlet at one end and an outlet at the other and being dimensioned such that communication between the inlet and outlet other than through the passageway is substantially obstructed, and a port being provided in the body which communicates with the passageway in the carrier between the O-rings, whereby the application of excess pressure to the port causes fluid to flow from the port to the outlet and the application of reduced pressure to the port causes fluid to flow from the inlet to the port.

The invention also provides a coupling comprising a body defining a smooth walled tubular passageway, a connector defining a spigot which is a sliding fit within the passageway, at least one O-ring retained in a groove extending around the spigot to seal with the wall of the passageway, an abutment surface movable relative to the body to a position aligned in the withdrawal direction of the connector with a portion of the inserted connector so as to prevent the inverted connector from sliding out of the passageway, and means for maintaining the abutment surface in the said position, the abutment surface being supported on a pivotal arm which is biased to the said position but may be pivoted to a further position in which withdrawal of the connector is not obstructed.

An embodiment of the present invention will now be described, by way of example, with reference to the accompanying drawings, in which:

FIG. 2 is an enlarged view of the valve assembly of the pump of FIG. 1;

FIG. 3 is an end view of the carrier of the valve assembly of FIG. 2; and

FIG. 4 is a section on line 4—4 of FIG. 3 one of the O-rings and its associated ball being omitted to better illustrate the groove provided to receive that O-ring.

Figure 1:
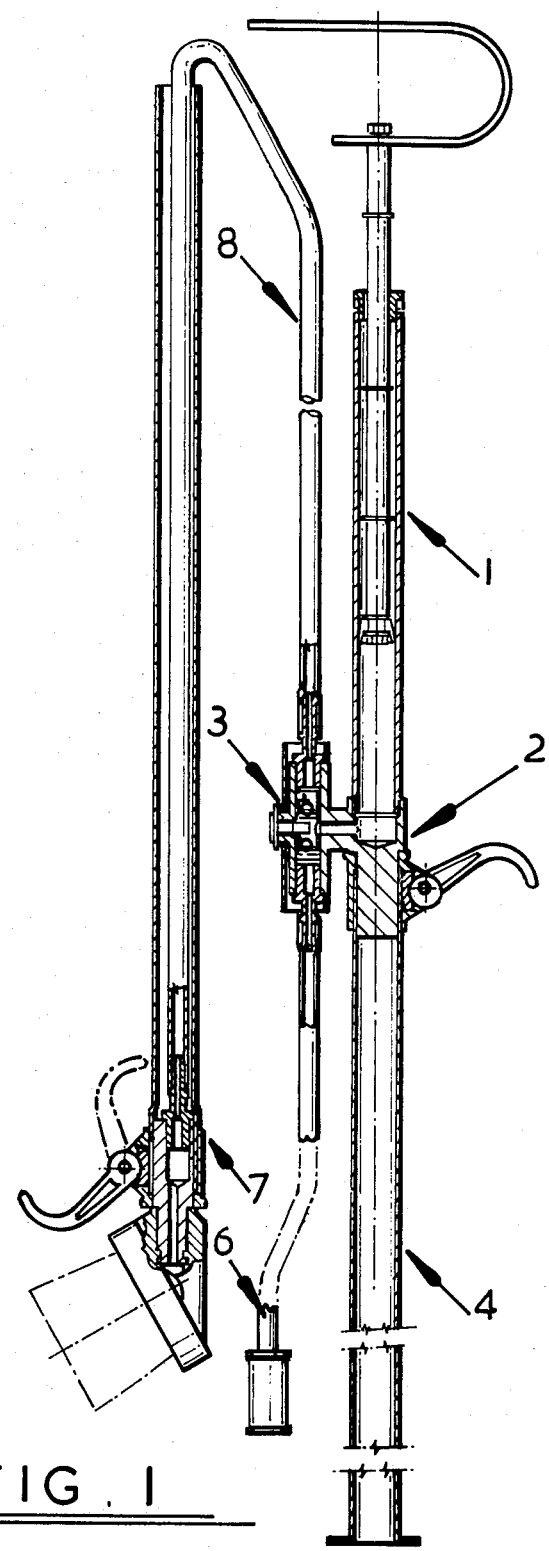
FIG. 1 is a part-sectional illustration of a complete stirrup pump and lance assembly embodying the present invention.

Referring to FIG. 1, the illustrated assembly comprises a hand operated pump 1 permanently secured to a casting 2 supporting a valve assembly 3 and mounted on a removable leg 4. The valve assembly is connected to a filter 5 by a flexible hose 6 and to a lance head 7 by a flexible hose 8. The lance head 7 is mounted on a lance tube 9 through which the hose 8 extends.

In use, the filter 5 is placed in a container of fluid. The foot of the leg 4 is then placed on the ground next to the container, the user's foot is placed on a base secured to the bottom of the leg 4, and the pump 1 is operated. As described below, the valve assembly is arranged so that as the pump handle is pulled up fluid is drawn up into the pump barrel from the container, and when the pump handle is pushed down fluid is pumped out of the pump body into the hose 8. The lance head may support a brush (as shown in outline) or other suitable device for spreading the pumped fluid.

Referring now to FIG. 2, the casting 2 comprises a lower solid cylindrical portion 10 which is received in the end of the tubular leg 4. The top of the leg 4 supports a locking device comprising a body 11, a lever 12 and a block 13, the block 13 being arranged adjacent a slot in the end of the tube 4 so as to face the side of the cylindrical portion 10 of the casting 2. With the lever 12 in the released position shown in full lines the block 13 is out of contact with the casting. As the lever is moved towards the locked position shown in broken lines, the block 13 is pushed towards and presses against the casting, locking the casting 2 and leg 4 together. Thus the pump 1 and casting 2 can be rapidly and easily fitted to the leg 4.

The casting 2 also comprises a generally tubular section 14 displaced to one side of the pump axis and communicating with the pump via a passageway 15. A tubular hollow carrier 16 is located in the section 14, the carrier 16 defining an aperture 17 registering with the passageway 15 and a second aperture facing aperture 17 through which the tip 18 of a plug 19 extends. The carrier 16 is further illustrated in FIGS. 3 and 4. A central portion of the plug 19 is threaded and engages a mating thread in the casting 2. The plug tip 18 thus retains the valve body 16 within the casting in a position in which the aperture 17 is aligned with the passageway 15.

Two annular grooves are machined in the inner wall of the carrier 16 and receive O-rings 20 and 21. The grooves are of rectangular cross-section and the radially outer parts of the O-rings are shaped in cross-section to closely fit the associated grooves. The O-ring 20 and associated ball 22 are not shown in FIG. 4 to more clearly show the shape of the groove provided to receive the O-ring 20. A first steel ball 22 is located between the rings 20 and 21 and below the plug tip 18. A second steel ball 23 is located above the ring 21, the ball being retained in the carrier 16 by a pushed in portion 24 of the rim of the carrier 16. Thus, when the pump handle is pulled out, the resultant low pressure in the pump body causes the ball 22 to lift off the ring 20 whereas the ball 23 is sucked down onto the ring 21 to seal off communication with the hose 8. When the pump handle is pushed in ball 22 is pressed down on ring 20 whereas the ball 23 is lifted off the ring 21. The required valve operation is thus obtained.

The tubular carrier 16 may be fabricated for example from a stainless steel tube with a length of 35 mm, outside diameter 12.5 mm, and internal diameter 10.0 mm. The valve balls may be of 8 mm diameter. The O-rings may be received in rectangular grooves of 2.0 width and 11.5 mm diameter to the groove bottom. The O-rings may be of 11 mm outside diameter when unrestrained, and 4.5 mm inside diameter, and are preferably of D-shaped section as shown. This provides a good resistance to any tendency for the O-rings to be pushed out of the grooves. In tests the O-rings have withstood pressures of 150 pounds per square inch. It is possible to use simple circular section O-rings however, although it is easier for such O-rings to be displaced. Obviously other dimensions could be selected if necessary. The tubular carrier 16 is a loose sliding fit in the casting section 14 so that it can be easily inserted and removed once the plug tip 18 is withdrawn. It is not necessary to carefully machine the components to close tolerances. Some leakage will occur between the carrier 16 and the casting but in most applications this is not important.

As can be seen from FIG. 4, the ends of the carrier 16 are tapered slightly but the major portion of the carrier is of uniform wall thickness. Such tapers are easy to machine and are provided to improve flow around the ball 23 and to ease insertion of the O-rings.

The hoses 6 and 8 are connected to the casting by connectors 25 which are identical. Each connector comprises a first spigot 26 that is a simple push fit into the hose and a second spigot 27 that supports an O-ring 28 and is a push fit into the casting. The connectors 25 are retained in position relative to the casting 2 by a rocking arm 29 portions 30 of which abut against flanges 31 supported by the connectors if the connectors are pulled partially out of the casting.

The arm 29 is secured to the casting by a washer 32 around the plug 19. The arm is sandwiched between two O-rings 33 so that it can be rocked about an axis perpendicular to the plane of FIG. 2. When rocked in the clockwise direction in FIG. 2 the connector 25 attached to hose 8 can be inserted or pulled out as its passage is no longer obstructed by arm portion 30. When rocked in the opposite direction the other connector can be inserted or pulled out. When released the arm 29 assumes the position shown as a result of the resilience of the O-rings 33 and thus retains both of the connectors 25 against removal.

It will be appreciated from the above that the described arrangement is manufactured from simple, easy to fabricate components which can be made in for example stainless steel at relatively low cost. Furthermore, the arrangement can be rapidly assembled without difficulty, even if the user is wearing cumbersome protective clothing, without requiring the use of any tools. The arrangement can thus be stored for a prolonged period in rugged conditions in the knowledge that when it is required it can be easily assembled and is so simple that it can be relied upon to work in the most adverse of conditions. Even if it is desired to dismantle the valve assembly for cleaning or inspection, this can be done simply by using a coin or other convenient object to turn the plug 19.

What is claimed is:

1. A valve assembly comprising a body defining an elongate bore and at least two ports communicating with the bore, the said at least two body ports being spaced apart along the length of the bore, a single tubular carrier located within and extending along the bore, the carrier being a loose sliding fit in the bore and defining carrier ports which are aligned with respective ones of said body ports, and a removable closure positioned at one end of the bore, wherein an annular groove is formed in the inside surface of the carrier between the carrier ports, the external diameter of the carrier and the internal diameter of the carrier on either side of the groove being substantially uniform, a valve seat in the form of an O-ring is retained in the groove, and a valve member in the form of a ball is retained within the carrier on one side of the O-ring, the outside diameter of the O-ring when unrestrained being larger than the said substantially uniform internal diameter of the carrier, and the outside diameter of the ball being less than the said substantially uniform internal diameter of the carrier, and the outside diameter of the ball being less than the said substantially uniform internal diameter of the carrier but greater than the internal diameter of the O-ring, and upon removal of said closure said carrier is slidably removed from said one end of the bore as a single unit for assemblying and disassemblying the valve components.

2. A valve assembly according to claim 1, wherein the ball is retained within the carrier between the O-ring and a portion of the tubular carrier which is bent inwards.

3. A valve assembly according to claim 1, wherein the or each groove is of rectangular cross-section and the radially outer part of the or each O-ring is shaped in cross-section to closely fit into the associated groove.

4. A valve assembly according to claim 1, wherein the body and carrier each define three ports with each port in the body being aligned with a corresponding port in the carrier, and two spaced apart O-rings and two balls are provided in the carrier, each O-ring being positioned between a respective pair of the carrier ports and one ball being located between the O-rings and the other being retained adjacent one of the O-rings at one end of the carrier.

5. A valve assembly according to claim 4 wherein a first said body port is an inlet located at one end of the bore, a second said body port is an outlet at the other end of the bore, communication between the inlet and outlet other than through the carrier being substantially obstructed, and a third body port communicates with a said carrier port located between the O-rings, whereby the application of excess pressure to the third port causes fluid to flow from that port to the outlet, and the application of reduced pressure to the third port causes fluid to flow from the inlet to that port.

* * * * *